Jan. 21, 1936.   H. J. KERR   2,028,160
PROTECTIVE COVERING FOR TUBES
Filed Feb. 9, 1929   3 Sheets-Sheet 1
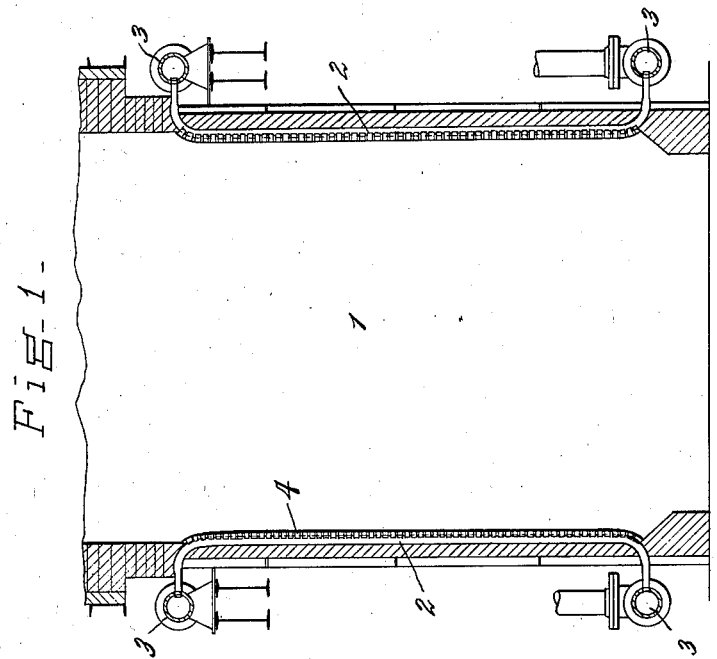
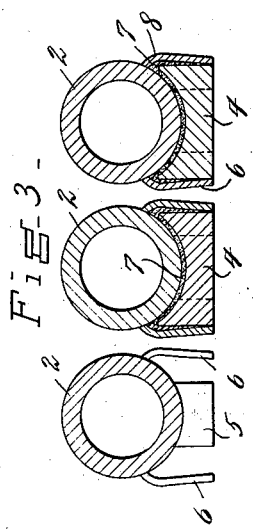
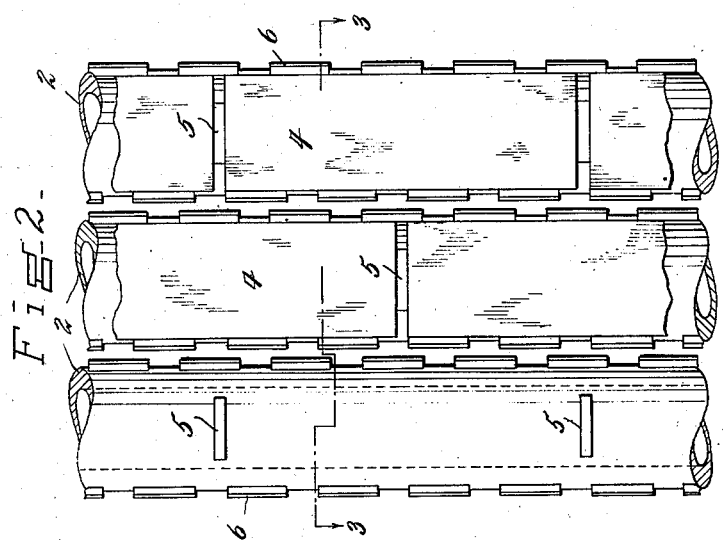
INVENTOR
Howard J. Kerr
BY
Gifford, Scull & Burgess
ATTORNEYS.

Jan. 21, 1936. H. J. KERR 2,028,160
PROTECTIVE COVERING FOR TUBES
Filed Feb. 9, 1929   3 Sheets-Sheet 2
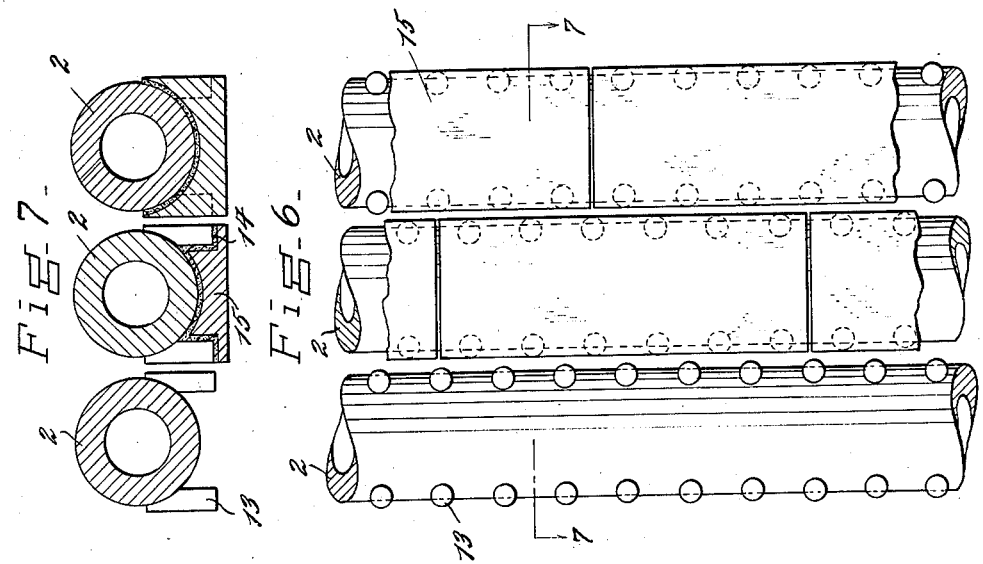
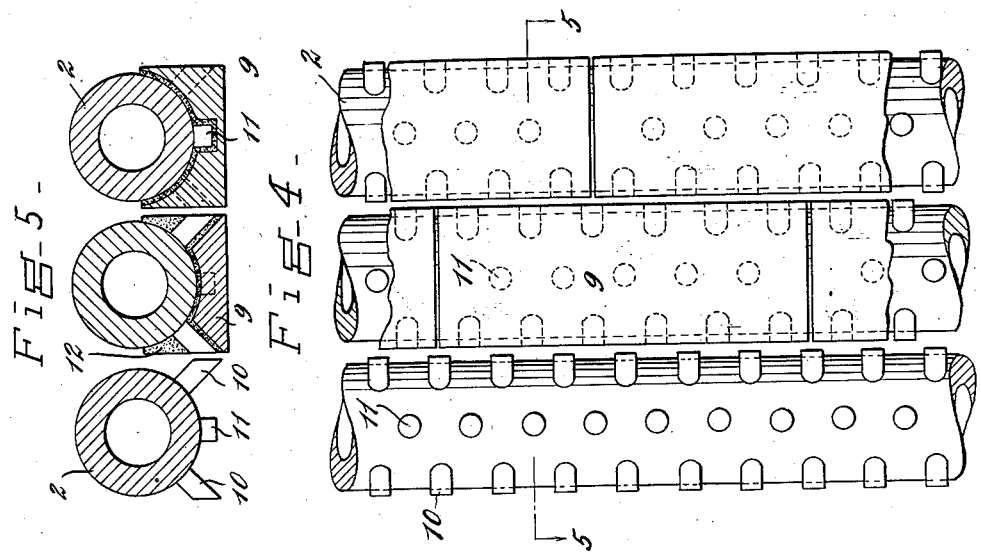
INVENTOR
Howard J. Kerr
BY
Gifford, Scull & Burgess
ATTORNEYS.

Jan. 21, 1936.  H. J. KERR  2,028,160
PROTECTIVE COVERING FOR TUBES
Filed Feb. 9, 1929  3 Sheets-Sheet 3
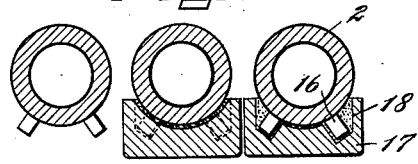
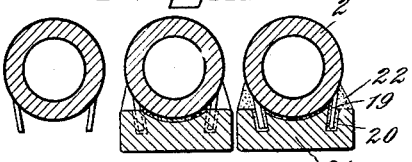
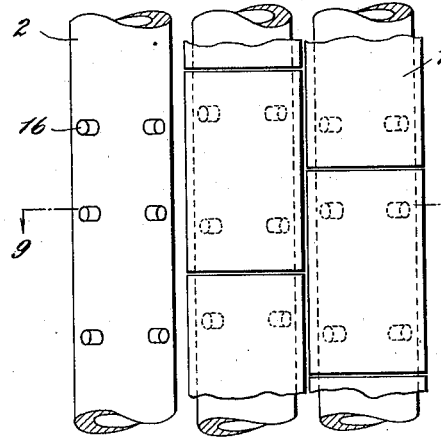
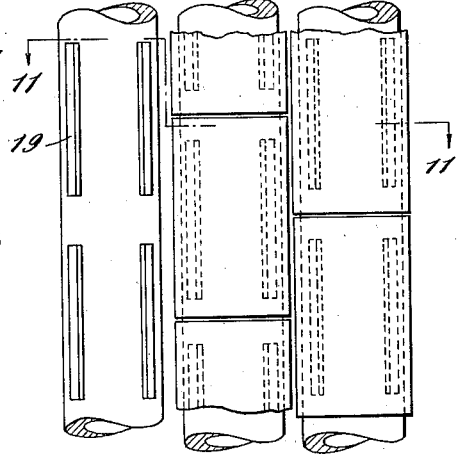
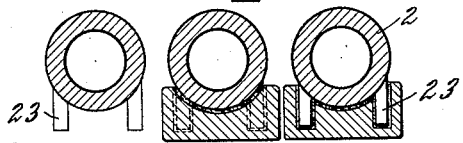
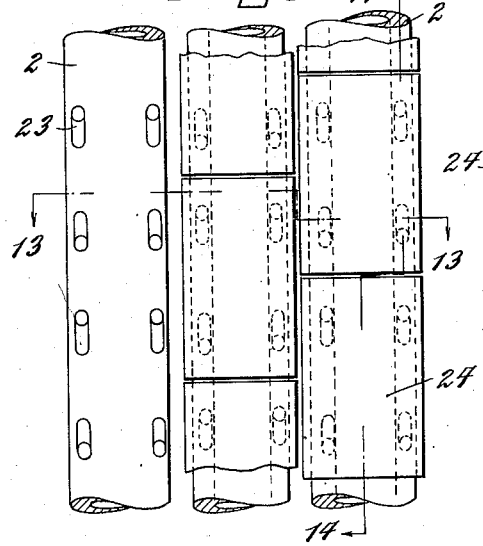
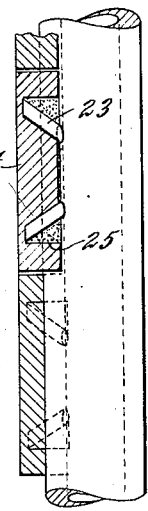
INVENTOR
Howard J. Kerr
BY
Gifford, Scull & Burgess
ATTORNEYS Patented Jan. 21, 1936

2,028,160

UNITED STATES PATENT OFFICE 2,028,160

PROTECTIVE COVERING FOR TUBES

Howard J. Kerr, Westfield, N. J., assignor to The Babcock & Wilcox Company, Bayonne, N. J., a corporation of New Jersey Application February 9, 1929, Serial No. 338,689

26 Claims. (Cl. 122—6)

This invention relates to a novel and improved form of covering adapted to protect tubes from the action of heat to which they may be subjected. The novel features will be best understood from the following description, when read in connection with the accompanying drawings, in which I have shown selected embodiments of the invention and in which;

Fig. 1 is a vertical sectional view through the lower part of a furnace, showing the invention as applied to the tubes of a radiant heat superheater.

Fig. 2 is a front view of the tubes shown in Fig. 1, and showing one form of the invention, the protective blocks being removed from one tube.

Fig. 3 is a section on the line 3—3 of Fig. 2.

Figs. 4 and 5, 6 and 7, 8 and 9, 10 and 11 and 12 and 13, are views corresponding respectively to Figs. 2 and 3, and showing different forms which the invention may take.

Fig. 14 is a view taken on the line 14—14 of Fig. 12.

Referring first to Fig. 1, there is shown therein a furnace having a combustion chamber 1 in opposite walls of which are disposed tubes 2 of a radiant heat superheater or superheaters, these tubes being connected at opposite ends to headers 3.

In the form of the invention shown in Figs. 2 and 3, each one of the tubes is provided with a plurality of outwardly projecting lugs forming between them spaces to receive refractory blocks 4. Certain of these lugs, designated 5, extend transversely to the length of the tubes, and form shelves upon which may rest the blocks 4 disposed above the lugs. Extending lengthwise of the tubes are other lugs 6 which with the lugs 5 define the spaces within which the blocks are received. As seen in Fig. 3, the outer ends of these lugs are substantially in engagement with the blocks 4, but sufficient room is left to permit the blocks to be placed in position between the lugs, and also, preferably, a suitable cement indicated at 7 is disposed between the lugs and tube on one side and the blocks on the other. In this form, the lugs 6 converge towards each other at their outer ends and their inner ends 8 are bent inwardly to be more nearly radial with respect to the tubes. The lugs may be secured to the tubes as by any suitable means, as by spot-welding.

Referring next to Figs. 4 and 5, I have shown therein a different form of the invention, in which each block 9 is secured to a tube by engagement with a plurality of radially extending lugs 10 and 11 secured to the tube as by welding, and disposed within recesses in the blocks. The recesses 12 which receive the side lugs 10 preferably extend to the rear or outer side of the block, as plainly shown in Fig. 5, whereby the block may be placed in position by a movement laterally of the tube. A suitable cement is then placed in the recesses 12, as plainly shown in Fig. 5, to prevent displacement of the block with respect to the tube. A suitable cement may also be placed between the tube itself and the block, and also between the lug 11 and the block, if found desirable.

In Fig. 7 is shown a still further embodiment of the invention, in which the tubes 2 are provided with lugs 13 disposed in rows along the sides of the tubes and extending directly inwardly toward the furnace. Recesses 14 are formed in the sides of the blocks 15 to receive these lugs, and in this form preferably a suitable cement is disposed between the tube and lugs on one side and the block on the other.

In Figs. 8 and 9 is shown a still further form in which the tubes 2 are provided with radially extending lugs 16 and the blocks 17 are provided with recesses 18 extending straight back to the back of the blocks, so as to permit the blocks to be placed in position laterally with respect to the tubes. The recesses are then filled with a suitable cement, as indicated.

In Figs. 10 and 11 is shown a still further form in which the tubes 2 are provided with lugs 19 which extend longitudinally of the tubes for a substantial distance, and converge towards each other as plainly shown in Fig. 11. Suitable recesses 20 are provided in the blocks 21 to receive these lugs, and then a suitable cement 22 is plastered on the outside of the lugs, as plainly shown in Fig. 11, this cement also of course entering the recesses and surrounding the lugs.

In Figs. 12, 13 and 14, a still further form is shown in which the lugs 23 extend straight inwardly from the tubes 2, as viewed in Fig. 13, but diverge from each other lengthwise of the tube, as plainly shown in Figs. 12 and 14. The blocks 24 are provided with recesses 25 in which the lugs are received, and these recesses also extend to the back of the tube so as to permit insertion of the lugs therein as the blocks are placed in position.

In each form shown, I prefer to employ a cement between the blocks and the tubes, as this forms an additional means for holding the parts together, and for conducting heat therebetween. In each form shown the blocks may be readily inserted in place by a straight lateral movement toward the tube.

I claim:—

1. In combination, a tube subjected to the action of heat, a plurality of lugs extending outwardly from the tube and secured thereto, said lugs having their outer ends disposed further apart than the ends secured to the tube, and refractory blocks having recesses within which said lugs are received, cement between the blocks and the tubes, said recesses extending to the back of the blocks and being of such form that the blocks may be secured on a tube by a movement toward the tube from one side only.

2. In combination, a row of tubes subjected on one side to the action of heat, blocks of refractory material disposed between said side of each tube and the source of said heat and having their sides toward a tube formed with a plurality of recesses, said blocks being arranged in a row extending lengthwise of the tube with the center of the row substantially in a plane perpendicular to the row of tubes and passing through the axis of the tube, cement between the blocks and the tubes, and lugs secured to the tube and projecting outwardly therefrom into recesses in said blocks, the lugs and recesses being so related that the blocks may be secured in operative position by movement toward the tube from one side only.

3. In combination, a row of tubes subjected on one side to the action of heat, blocks of refractory material disposed between said side of each tube and the source of said heat and having their sides toward a tube formed with a plurality of recesses, said blocks being arranged in a row extending lengthwise of the tube with the center of the row substantially in a plane perpendicular to the row of tubes and passing through the axis of the tube, cement between the blocks and the tubes, lugs secured to the tube and projecting outwardly therefrom into recesses in said blocks, and cement in said recesses engaging said lugs, the lugs and recesses being so related that the blocks may be secured in operative position by movement toward the tube from one side only.

4. In combination, a row of tubes subjected on one side to the action of heat, blocks of refractory material disposed between said side of each tube and the source of said heat, said blocks being arranged in a row extending lengthwise of the tube with the center of the row substantially in a plane perpendicular to the row of tubes and passing through the axis of the tube, lugs secured to the tube and projecting outwardly therefrom on opposite sides of the blocks, said lugs having their outer ends disposed further apart than the ends secured to the tube, the blocks having recesses in which said lugs are disposed, said recesses extending to the back of the blocks and being of such form that the blocks may be placed on the tube by a straight movement laterally thereto.

5. In fluid heat exchange apparatus, a furnace having a combustion chamber, a row of spaced cylindrical tubes arranged along a wall of the furnace and conducting a fluid which receives heat through the tubes from burning fuel in the furnace, refractory tube protector tiles cemented to the tubes and securable in tube embracing positions from the inside of the chamber by movements toward one side only of the wall formed by the tubes, said tiles formed with recesses extending from their concave sides and securing means including metallic anchors projecting from the tubes and adapted to be embedded in cement in said recesses for holding the blocks in position wherein their inside plane surfaces form a wall face spaced from the tubes and the side portions of adjacent rows of blocks substantially fill up the spaces between adjacent tubes, each tube having its furnace side completely covered by a single row of said tiles.

6. Fluid heat exchange apparatus of the type disclosed comprising, in combination, a furnace having a combustion chamber, a row of spaced cylindrical tubes conducting a fluid along a wall of the furnace and adapted to transmit heat from burning fuel within the furnace to the fluid, refractory plano-concave tube protector tiles with their concave sides having a curvature to correspond to the curvature of the tubes and formed with recesses extending into the tile from their curved sides and securing means including metallic anchors projecting from the tubes and adapted to be embedded in cement in the recesses for holding the tiles in operative position wherein they form a substantially continuous wall between the tubes and the burning fuel to protect the tubes from excessive heat damage, said tiles embracing the tubes along which they are arranged in series, each tile being of a face width greater than the diameter of the tube, the said parts being so arranged that the tiles are securable in tube embracing position from the inside of the furnace.

7. Fluid heat exchange apparatus of the type disclosed comprising, in combination, a furnace having a combustion chamber, a row of cylindrical spaced tubes conducting a fluid along a wall of the furnace, and adapted to transmit heat from burning fuel within the furnace to the fluid, refractory plano-concave tube protector tiles with their concave sides having a curvature to correspond to the curvature of the tubes, and securing means including flat metallic anchors projecting from the tubes and forming separate shelves separately holding the tiles in operative position wherein they form a substantially continuous wall between the tubes and the burning fuel, to protect the tubes from excessive heat damage, said tiles embracing the tubes along which they are arranged in series, each tile being of a face width greater than the diameter of a tube, the said parts being so arranged that the tiles are securable in tube embracing position from the inside of the furnace by movement along said shelves.

8. In fluid heat exchange apparatus, a furnace having a combustion chamber, a row of spaced metallic tubes arranged along a wall of the chamber so that a fluid flowing through the tubes absorbs heat transmitted through the tube walls from burning fuel in the furnace, a row of spaced and separate and preformed refractory blocks carried wholly by each tube along its furnace side and cemented thereto, metallic members attached to each tube by welding for maintaining its row of blocks in operative position with each block individually held on the tube, the blocks being preformed and shaped on their back sides to conform to the furnace faces of the tubes.

9. In a furnace, the combination of a wall composed of vertical closely spaced fluid-carrying tubes, having clips welded thereto and recessed blocks of high heat conductivity and high fusion temperature independently supported on the furnace side of the tubes by said clips and said clips being accommodated by the recesses formed in the blocks and the blocks being cemented to the tubes, said blocks shielding the tubes on the furnace side only thereof.

10. In a furnace, spaced wall tubes connected into a fluid circulation, refractory blocks on the furnace sides of the tubes, and metallic members welded to opposite sides of the tubes in positions parallel to the longitudinal axes of the tubes and arranged in good thermal relationship with the edge portions of the blocks throughout their extension from the tubes, said members extending from the tubes a distance approximately equal to the maximum thickness of the blocks and having their outer ends exposed to heat from the furnace.

11. In a furnace, spaced wall cooling tubes preformed and separate plano-concave refractory blocks having their concave sides fitting against the furnace faces of the tubes, and metal elements welded to the tubes and in such good thermal contact with the thicker portions of the blocks that the latter are protected against overheating.

12. Spaced and upright furnace wall tubes, said tubes having secured thereto preformed and separate wall blocks which have their marginal parts protected throughout their thickness by cooling means having a thermal conductivity greater than that of other parts of the blocks.

13. In a furnace, a row of spaced wall cooling tubes, and preformed and separate plano-concave wall blocks cemented to the tubes with each tube independently carrying its own row of complete blocks.

14. In a furnace, a row of spaced wall cooling tubes, wall blocks secured to the tubes along their furnace faces with each tube carrying its own row of blocks, and metallic members welded to the tubes between the blocks and extending to the furnace face formed by the blocks so as to protect the edge portions of the blocks against overheating.

15. In a furnace, a row of spaced wall cooling tubes, plano-concave blocks cemented to the tubes with each tube carrying its own row of blocks, metallic plates or bars positioned longitudinally of the tubes and welded thereto, and transverse plates welded to the tubes, said plates and longitudinal elements forming a series of pockets with each pocket arranged to hold a block and receive it in closely fitting relationship.

16. In fluid heat exchange apparatus, a furnace, a furnace wall including spaced tubes connected into a fluid circulation, means for burning fuel in the furnace, refractory blocks cemented on the furnace sides of the tubes, and metallic members welded to opposite sides of the tubes in positions parallel to the longitudinal axes of the tubes and arranged in good thermal relationship with the edge portions of the blocks, said members extending from the tubes a distance approximately equal to the maximum thickness of the blocks.

17. In fluid heat exchange apparatus, spaced furnace wall cooling tubes, preformed and separate plano-concave refractory blocks having their concave sides fitting and cemented against the furnace faces of the tubes, and metal elements welded to the tubes and in such good thermal contact with the thicker portions of the blocks that the latter are protected against overheating.

18. In fluid heat exchange apparatus, spaced and upright furnace wall tubes, said tubes having cemented thereto preformed and separate wall blocks which have their marginal parts protected throughout their thickness by cooling means having a thermal conductivity greater than that of other parts of the blocks.

19. In fluid heat exchange apparatus, a furnace, a row of spaced wall cooling tubes subjected to heat from burning fuel in the furnace, and separate preformed refractory wall blocks cemented to the tubes and subjected directly to heat from burning fuel in the furnace.

20. In fluid heat exchange apparatus, a furnace, a row of spaced wall cooling tubes, recessed wall blocks cemented to the tubes along their furnace faces with each tube carrying its own row of blocks, and metallic members welded to the tubes and cemented within the recesses in the blocks.

21. In fluid heat exchange apparatus, a furnace, a row of spaced wall cooling tubes, refractory heat conducting blocks cemented to the tubes, metallic plates or bars positioned longitudinally of the tubes and welded thereto, and transverse plates welded to the tubes, said plates and longitudinal elements forming a series of pockets with each pocket arranged to hold a block and receive it in closely fitting relationship.

22. In fluid heat exchange apparatus, a furnace, fuel burning means, spaced tubes arranged along a wall of the furnace and connected into a fluid system to form a radiantly heated superheater, heat conducting refractory covering the furnace faces of the tubes, and a cementitious layer holding the refractory against the tubes.

23. In a fluid heat exchange apparatus, a furnace, a row of spaced wall cooling tubes subjected to the heat of burning fuel in the furnace, diverging metallic studs welded to the tubes and separate preformed refractory wall blocks having portions disposed between the studs, said blocks being cemented to the tubes and subjected directly to the heat of burning fuel in the furnace.

24. In a fluid heat exchange apparatus, a furnace, a row of spaced wall cooling tubes subjected to the heat of burning fuel in the furnace, spaced metallic studs welded to the tubes and separate preformed refractory wall blocks having portions disposed between the studs, said blocks being cemented to the tubes and subjected directly to the heat of burning fuel in the furnace.

25. In a fluid heat exchange apparatus, a furnace, a row of spaced wall cooling tubes subjected to the heat of burning fuel in the furnace, upwardly and directly diverging metallic studs welded to the tubes and separate preformed refractory wall blocks having portions disposed between the studs, said blocks being cemented to the tubes and subjected directly to the heat of burning fuel in the furnace.

26. In a fluid heat exchange apparatus, a furnace, a row of spaced wall cooling tubes subjected to the heat of burning fuel in the furnace, pairs of converging metallic studs welded to the tubes and separate preformed refractory wall blocks having portions disposed between the studs, said blocks being cemented to the tubes and subjected directly to the heat of burning fuel in the furnace.

HOWARD J. KERR.